United States Patent [19]
Ogawa

[11] Patent Number: 6,160,954
[45] Date of Patent: Dec. 12, 2000

[54] DEVICE FOR AND METHOD OF REPRODUCING RECORDING MEDIUM

[75] Inventor: Kenji Ogawa, Tokyo, Japan

[73] Assignee: Sony Corporation, Tokyo, Japan

[21] Appl. No.: 08/960,015

[22] Filed: Oct. 29, 1997

[30] Foreign Application Priority Data

Oct. 31, 1996 [JP] Japan .................................. 8-289455

[51] Int. Cl.$^7$ .................................................. H04N 5/781
[52] U.S. Cl. ........................... 386/111; 386/126; 369/47; 369/58
[58] Field of Search ...................... 386/33, 40, 111–112, 386/125–126, 124, 95; 369/47, 58

[56] References Cited

U.S. PATENT DOCUMENTS

| | | | |
|---|---|---|---|
| 5,854,873 | 12/1998 | Mori et al. | 386/92 |
| 5,870,523 | 2/1999 | Kikuchi et al. | 386/95 |
| 5,905,875 | 5/1999 | Okada et al. | 386/98 |
| 5,907,658 | 5/1999 | Murase et al. | 386/95 |

*Primary Examiner*—Wendy Garber
*Assistant Examiner*—Thanh Pham
*Attorney, Agent, or Firm*—Frommer Lawrence & Haug, LLP.; William S. Frommer

[57] ABSTRACT

A device for and a method of reproducing a recording medium in which times corresponding to a predetermined number of data units are defined as time units, a first block is composed of a plurality of the data units, a second block is composed of a plurality of the first blocks, and first times each indicative of a reproduction time in each second block are recorded in the first blocks in the time units respectively. The recording medium reproducing device comprises a unit for reproducing the recording medium, a counter for counting the time units corresponding to the number of the reproduced data units within each first block and clearing its count when all the data units in the first block are played back, and a first storing unit for storing therein the first time as a reproduction time used up to that time when the data units in the first block are all reproduced.

10 Claims, 12 Drawing Sheets

IN-VOBU REPRODUCTION TIME + IN-CELL REPRODUCTION TIME + IN-PGC REPRODUCTION TIME + PGC REPRODUCTION TIME = TOTAL REPRODUCTION TIME

DEVICE FOR AND METHOD OF REPRODUCING RECORDING MEDIUM

BACKGROUND OF THE INVENTION

1. Field of the Invention

This invention relates to a device for and a method of reproducing a recording medium, and particularly to a device for and a method of reproducing a recording medium, wherein the time required to reproduce an image recorded in the recording medium can be accurately computed and specified.

2. Description of the Related Art

In recent years, a DVD (Digital Versatile Disc) has been standardized and is becoming pervasive. Two types of time information are recorded on this DVD.

One of the two is a time system represented in the form of such a 32-bit integer that one second is expressed by 90000 counts with those obtained by dividing one second into 90000 equal parts as units. This is called "time stamp". Another one is a time system obtained by adding a graph representative of whether one second is defined by 25 frames or 30 frames to the time, minute, second and frame represented by BCD (Binary Coded Decimal) such that one second is expressed by 25 frames or 30 frames with a frame of image as a unit. This is called "time code". This time code can be also expressed as one in which the number of frames has been counted.

The time stamp indicates a relative actual time counted from a given standard time. Thus, no error is produced between the same and the actual time. In contrast to this, the time code is defined as a time system having an error between the same and an actual time because the number of frames is defined as the unit, e.g., the number of frames displayed per second is not an integer accurately in the case of, for example, an NTSC image signal.

FIG. 7 shows a structure of VMG and VTS recorded as a UDF (Universal Disc Format) of a DVD. As shown in the same drawing, the VMG (Video Manager) is recorded at the head thereof and n VTS (Video Title Set) are next recorded behind the VMG.

The head of VMG is defined as a control data area in which Video Manager Information (VMGI) is recorded. The same VMGI is recorded even in a backup area located at the end of VMG. VOBS (Video Object Set) for Menu (VMGM_VOBS) is recorded between them.

A control data area is formed at the head of VTS. Video Title Set Information (VTSI) is recorded in the control data area. VOBS for Menu (VTSM_VOBS) is recorded subsequent to the control data area. Further, VOBS for Title (VTSTT_VOBS) including one to nine files is recorded subsequent to the VOBS for Menu (VTSM_VOBS). VTSI identical to that for the control data area is recorded at the end of VTS as backup.

ID numbers for cells included in individual VOB (Video Object) are described in VTSTT_VOBS.

PGCI (Program Chain Information) is recorded in VMGI or VTSI in the control data area of VMG or VTS.

FIG. 8 shows an example of a configuration of PGCI. As shown in the same drawing, PGCI comprises a plurality of PGC (Program chains). Numbers of cells constituting the individual PGC are respectively recorded in the respective PGC. Further, time information about PGC Playback Time (PGC_PB_TM) and Cell Playback Time (C_PBTM) are recorded in this PGCI in time code notation. PGC_PB_TM is one obtained by representing the total playback or reproduction time required to reproduce a series of cells included in the individual program chains in the form of a time code. C_PBTM are those obtained by representing times or time intervals required to reproduce the individual cells included in the program chains in the form of time codes.

FIG. 9 shows a hierarchized physical data structure of the DVD. A Video Object Set (VOBS) is composed of a plurality (i in an example shown in FIG. 9) of Video Objects (VOB). Further, each Video Object is comprised of a plurality (j in the example shown in FIG. 9) of cells. Incidentally, VOB_IDNk shown in the drawing indicate ID numbers of the video objects respectively and C_IDNk indicate ID numbers of the cells respectively.

Each cell is composed of a plurality of video object units (Video Object Units (VOBU)). Further, the video object unit is composed of a navigation pack (Navigation Pack (NV_PCK)), audio packs (Audio Packs (A_PCK)), video packs (Video Packs (V_PCK)) and sub picture packs (Sub Picture Pack (SP_PCK)). As shown in FIG. 9, the navigation pack is disposed only at the head of each video object unit.

Audio data, video data and captions data are individually compressed and encoded in the-audio pack, the video pack and the sub picture pack and recorded therein. Added information for smoothly performing processes such as normal reproduction, special reproduction, etc. is recorded in the navigation pack. At least three pieces of time information are recorded in the navigation pack. One of them is Presentation Start Time of VOBU (VOBU_S_PTM) and another one is Presentation End Time of VOBU (VOBU_E_PTM). They are those obtained by representing reproduction start times and reproduction end times of their corresponding video object units in time stamp notation. A further one is Cell Elapse Time (C_ELTM) which is one obtained by representing a reproduction start time counted from the head of each cell including it, of the corresponding video object unit in the form of a time code.

Meanwhile, the time information represented in the form of the time stamp has no error between the same and an actual time but is entered in the navigation pack alone. Thus, in order to recognize the total reproduction time for the whole cells from the time information expressed in the time stamp rotation, for example, a reference must be made to VOBU_S_PTM of the navigation pack in the leading video object unit of each cell and VOBU_E_PTM of the navigation pack in the final VOBU of each cell. In order to recognize the overall reproduction time of each program chain comprising a plurality of cells on a time-stamp basis, the reproduction times must be determined every cells and added up with respect to all the cells included in the program chain. Therefore, a long calculation time interval is required for purposes of obtaining the total reproduction time in the program chain on a time-stamp basis and hence its practicality is next to impossible.

On the other hand, since the time information expressed in time code is recorded in PGCI, a reference may be made to one PGCI to determine the whole reproduction time of program chain. As compared with the case in which the time information expressed in time stamp is obtained, this can be done in an extreme short time.

In the time codes, however, the time is expressed in frame units, whereas image data in each video pack exist in field units. Thus, the time to be recorded inevitably results in time expressed in field units. However, when the time is expressed on a time-code basis, the expression of the time in frame units is not to be avoided. As a result, the time code might have an error of a time interval corresponding to one field.

A method of producing or creating the time information is not defined in the format of the DVD. Therefore, time errors each corresponding to one field are cumulated depending on the creating method in the case of the time information expressed in the time codes. Thus, a large error might be produced between the number of frames expressed in time codes and the number of frames displayed in practice.

Now consider where as shown in FIG. 10 by way of example, the number of fields of an image, which is contained in one video object unit, is 61 fields (1 second +1 field) and reproduction times in individual video object units are represented in time codes. Assuming that the remaining one filed is cut off, an error of one field is produced with respect to one video object unit. Assuming that 60 video object units exist in one cell, the total reproduction time expressed in the time code, per cell (corresponding to 60 video object units) has an error of 60 fields at the maximum.

Thus, if, for example, time codes are created every video object units and C_ELTM or C_PBTM is produced from the sum of them, then a large error is produced between C_ELTM or C_PBTM and the actual reproduction time.

Similarly, the error exists even between each cell and the program chain. Namely, now consider that as shown in FIG. 11, the number of fields of images included in individual cells is 3601 fields (1 minute+1 field) and the reproduction time for each cell is expressed in form of a time code. Assuming that the remaining one field is omitted or cut off, the reproduction time obtained in the time code becomes shorter than a reproduction time acquired from the displayed number of frames. Assuming that one program chain is comprised of 100 cells as shown in FIG. 11, its error results in 100 fields at the maximum.

Thus, if the time codes are created every cell and PGc_PB_TM is produced from the sum of them, then a large error is produced between the value thereof and a reproduction time obtained from the displayed number of frames of an image.

Assuming that as shown in FIG. 12, for example, one cell is composed of 60 video object units, each video object unit is composed of 61 fields and each time code is calculated by cutting off the remaining one field, the time required to actually display one cell results in 1 minute and 1 second (3660 fields) but the reproduction time expressed in the time code reaches 1 minute. As a result, an error of 60 fields is produced per cell. Thus, assuming that 60 cells are reproduced, an error of 3600 fields is produced.

When the reproduction time is calculated using the time information expressed in the time code notation as described above, a plurality of reproduction times are obtained for each program according to the difference between the computing methods. Thus, when the present reproduction time (corresponding to a reproduction time from the head of a program to the present display position) of a predetermined DVD is displayed on a reproducing device reproducing the DVD, for example, the displayed reproduction time differs according to the difference between the reproduction time computing methods even if the same program is displayed.

Thus, when a reproduction start position is specified by the reproduction time as counted from the head of the program, for example, the position to actually start the reproduction differs according to the reproducing device even if the same time is specified. Consequently, when a position set proximately to the completion of the program is specified as the reproduction start position at worst, a situation in which an image corresponding to a specified time thereof does not exist, is also brought about.

Typical ones of various inventions of the present application have been shown in brief. However, the various inventions of the present application and specific configurations of these inventions will be understood from the following description.

SUMMARY OF THE INVENTION

With the foregoing in view, it is therefore an object of the present invention to provide a device for and a method of reproducing a recording medium, wherein a reproduction time can be accurately computed and specified.

According to a first aspect of this invention, for achieving the above object, there is thus provided a device for reproducing a recording medium, comprising:

means for reproducing the recording medium in which times corresponding to a predetermined number of data units are defined as time units, a first block is composed of a plurality of the data units, a second block is composed of a plurality of the first blocks, and first times each indicative of a reproduction time in each second block are recorded in the first blocks in the time units respectively;

means for counting the time units corresponding to the number of the reproduced data units within each first block and clearing their count when all the data units in the first block are played back; and first storing means for storing therein the first time as a reproduction time used up to that time when the data units in the first block are all reproduced.

According to a second aspect of this invention, there is provided a method of reproducing a recording medium, comprising the following steps:

a step for reproducing the recording medium in which times corresponding to a predetermined number of data units are defined as time units, a first block is composed of a plurality of the data units, a second block is composed of a plurality of the first blocks, and first times each indicative of a reproduction time in each second block are recorded in the first blocks in the time units respectively;

a counting step for counting the time units corresponding to the number of the reproduced data units within each first block and clearing their counted values when all the data units in the first block are played back; and a first storing step for storing therein the first time as a reproduction time used up to that time when the data units in the first block are all reproduced.

According to a third aspect of this invention, there is provided a device for reproducing a recording medium, comprising:

means for reproducing the recording medium in which times corresponding to a predetermined number of data units are defined as time units, a first block is composed of a plurality of the data units, a second block is composed of a plurality of the first blocks, a third block is composed of a plurality of the second blocks, first times each indicative of a reproduction time in each second block are recorded in the first blocks in the time units respectively, and second times indicative of the total reproduction time in the second block are recorded at predetermined positions;

first operating means for computing the total reproduction time in the third block by cumulatively adding the second times together;

first storing means for storing therein the total reproduction time included till the immediately preceding third block from the initial third block at which the value cumulatively added by the first operating means becomes greater than a specified time;

second storing means for storing therein the total reproduction time included till the immediately preceding second block as viewed from the initial second block at which an added value obtained by cumulatively adding each second time in the second block of the initial third block, which is greater than the specified time, to the value stored in the first storing means, becomes greater than the specified time;

first retrieving means for retrieving the first block whose start and end times are respectively posterior and anterior to the specified time in the initial second block at which the added value becomes greater than the specified time; and second retrieving means for retrieving the data unit corresponding to the specified time from the first block retrieved by the first retrieving means.

According to a fourth aspect of this invention, there is provided a method of reproducing a recording medium in which times corresponding to a predetermined number of data units are defined as time units, a first block is composed of a plurality of the data units, a second block is composed of a plurality of the first blocks, a third block is composed of a plurality of the second blocks, first times each indicative of a reproduction time in each second block are recorded in the first blocks in the time units respectively, and second times indicative of the total reproduction time in the second block are recorded at predetermined positions, comprising the following steps:

a first operating step for computing the total reproduction time in the third block by cumulatively adding the second times together;

a first storing step for storing therein the total reproduction time included till the immediately preceding third block from the initial third block at which the value cumulatively added in the first operating step becomes greater than a specified time;

a second storing step for storing therein the total reproduction time included till the immediately preceding second block as viewed from the initial second block at which an added value obtained by cumulatively adding each second time in the second block of the initial third block, which is greater than the specified time, to the value stored in the first storing step, becomes greater than the specified time;

a first retrieving step for retrieving a first block whose start and end times are respectively posterior and anterior to the specified time in the initial second block at which the added value becomes greater than the specified time; and a second retrieving step for retrieving the data unit corresponding to the specified time from the first block retrieved in the first retrieving step.

According to a fifth aspect of this invention, there is provided a device for reproducing a recording medium, comprising:

means for reproducing the recording medium wherein times corresponding to a plurality of lengths of a predetermined number of data units are defined as time units, a first block is composed of a plurality of the data units, a second block is composed of a plurality of the first blocks, a third block is composed of a plurality of the second blocks, first times each indicative of a reproduction time in each second block are recorded in the first blocks in the time units respectively, and second times indicative of the total reproduction time in the second block are recorded at predetermined positions;

means for managing a reproduction time of the recording medium; and means for detecting a reproduction position of the recording medium;

the managing means including, counting means for counting time units corresponding to the number of the reproduced data units within the first block and clearing their counted values when all the data units in the first block are played back, first storing means for storing therein the first time as a reproduction time included till its reproduction when the data units in the first block are all reproduced, and clearing its stored value when all the first blocks in the second block are played back, and second storing means for storing therein the second time as a reproduction time included till its reproduction when all the first blocks in the second block are reproduced, and the detecting means including, first operating means for computing the total reproduction time in the third block by cumulatively adding the second times, third storing means for storing therein the total reproduction time included till the immediately preceding third block from the initial third block at which the value cumulatively added by the first operating means becomes greater than a specified time, fourth storing means for storing therein the total reproduction time included till the immediately preceding second block as viewed from the initial second block at which an added value obtained by cumulatively adding each second time in the second block of the initial third block, which is greater than the specified time, to the value stored in the third storing means, becomes greater than the specified time, first retrieving means for retrieving the first block whose start and end times are respectively posterior and anterior to the specified time in the initial second block at which the added value becomes greater than the specified time, and second retrieving means for retrieving the data unit corresponding to the specified time from the first block retrieved by the first retrieving means.

According to a sixth aspect of this invention, there is provided a method of reproducing a recording medium, comprising the following steps:

a step for reproducing the recording medium wherein times corresponding to a plurality of lengths of data units to be reproduced are defined as time units, a first block is composed of a plurality of the data units, a second block is composed of a plurality of the first blocks, a third block is composed of a plurality of the second blocks, first times each indicative of a reproduction time in each second block are recorded in the first blocks in the time units respectively, and second times indicative of the total reproduction time in the second block are recorded at predetermined positions; and in order to manage the reproduction time of the recording medium, a counting step for counting the time units corresponding to the number of the reproduced data units within the first block and clearing their counted values when all the data units in the first block are played back, a first storing step for storing therein the first time as a reproduction time included till its reproduction when the data units in the first block are all reproduced, and clearing its stored value when all the first blocks in the second block are played back, and a second storing step for storing therein the second time as a reproduction time included till its reproduction when all the first blocks in the second block are reproduced, and in order to specify a reproduction position of the recording medium, a first operating step for computing the total reproduction time in the third block by cumulatively adding the second times, a third storing step for storing therein the total reproduction time included till the immediately preceding third block from the initial third block at which the value cumulatively added in the first operating step becomes greater than a specified time, a fourth storing step for storing therein the total reproduction time included till the immediately preceding second block as viewed from the initial second block at which an added value obtained by cumulatively adding each second time in the second block of the initial third block, which is greater than the specified time, to the value stored in the third storing step, becomes greater than the specified time, a first retrieving step for retrieving the first block whose start and end times are respectively posterior and anterior to the specified time in the initial second block at which the added value becomes greater than the specified time, and a second retrieving step for retrieving the data unit corresponding to the specified time from the first block retrieved in the first retrieving step.

In the recording medium reproducing device according to the first aspect of the invention and the method of reproducing the recording medium, according to the second aspect of the invention, the time units corresponding to the number of the reproduced data units within each first block are counted. Their counted values are cleared when all the data units in the first block are played back. The first time is stored as a reproduction time used up to that time when the data units in the first block are all reproduced. It is thus possible to prevent the cumulation of errors and accurately determine the reproduction time.

In the recording medium reproducing device according to the third aspect of the invention and the method of reproducing the recording medium, according to the fourth aspect of the invention, the total reproduction time in the third block is determined or computed by cumulatively adding the second times together. The total reproduction time included till the immediately preceding third block from the initial third block at which the cumulatively added value becomes greater than a specified time, is stored. Further, the total reproduction time included till the immediately preceding second block as viewed from the initial second block at which an added value obtained by cumulatively adding each second time in the second block of the initial third block, which is greater than the specified time, to the stored value stored, becomes greater than the specified time, is stored. In the initial second block at which the added value becomes greater than the specified time, the first block whose start and end times are respectively posterior and anterior to the specified time, is retrieved. The data unit corresponding to the specified time is further retrieved from the retrieved first block. It is thus possible to accurately specify a reproduction start position with a reproduction start time.

In the recording medium reproducing device according to the fifth aspect of the invention and the method of reproducing the recording medium, according to the sixth aspect of the invention, since the above-describe d reproduction time computing method and reproduction start position retrieving method are used, the reproduction can be started from the accurate position.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein.

DETAILED DESCRIPTION OF THE PREFERRED EMBODIMENTS

Preferred embodiments of the present invention will be described below. However, in order to clarify the correspondence of individual means in the invention and the following embodiments, the features of the present invention will be described in the following manner by defining or placing the corresponding embodiments (one embodiments here) within the parentheses subsequent to the individual means. It is however needless to say that this description is not intended to be limited to those descriptive of the individual means.

A recording medium reproducing device according to the present invention comprises a counting means (corresponding to a counter 34 shown in FIG. 2 as an example) for counting time units corresponding to the number of reproduced data units within each first block and clearing its count when all the data units in the first block are played back, and a first storing means (corresponding to a buffer 33 shown in FIG. 2 as an example) for storing therein a first time as a reproduction time used till its reproduction when the data units in the first block are all reproduced.

The recording medium reproducing device also includes a second storing means (corresponding to a cumulative adder 32 shown in FIG. 2 as an example) which records each second time indicative of the total reproduction time in a second block at a predetermined position on a recording medium and clears the value stored in the first storing means when all the first blocks in the second block are reproduced and which, when all the first blocks in the second block are reproduced, cumulatively adds the second time to the stored value at that time and stores therein the result of addition as a reproduction time used till its reproduction.

The recording medium reproducing device further includes a third storing means (corresponding to a cumulative adder 31 shown in FIG. 2 by way of example) having a third block composed of a plurality of second blocks and which clears the value stored in the second storing means when all the second blocks in the third block are reproduced and which, when all the second blocks in the third block are reproduced, cumulatively adds a value stored in the second storing means prior to being cleared, to the previously-stored value and stores the result of addition therein.

A method of reproducing a recording medium, according to the present invention comprises the following steps: a counting step (corresponding to Step S8 shown in FIG. 3 by way of example) for counting a time unit corresponding to the number of reproduced data units within a first block and clearing its count when all the data units in the first block are played back, and a first storing step (corresponding to Step S9 shown in FIG. 3 as an example) for storing therein a first time as a reproduction time used till then when the data units in the first block are all reproduced.

Figure 5:
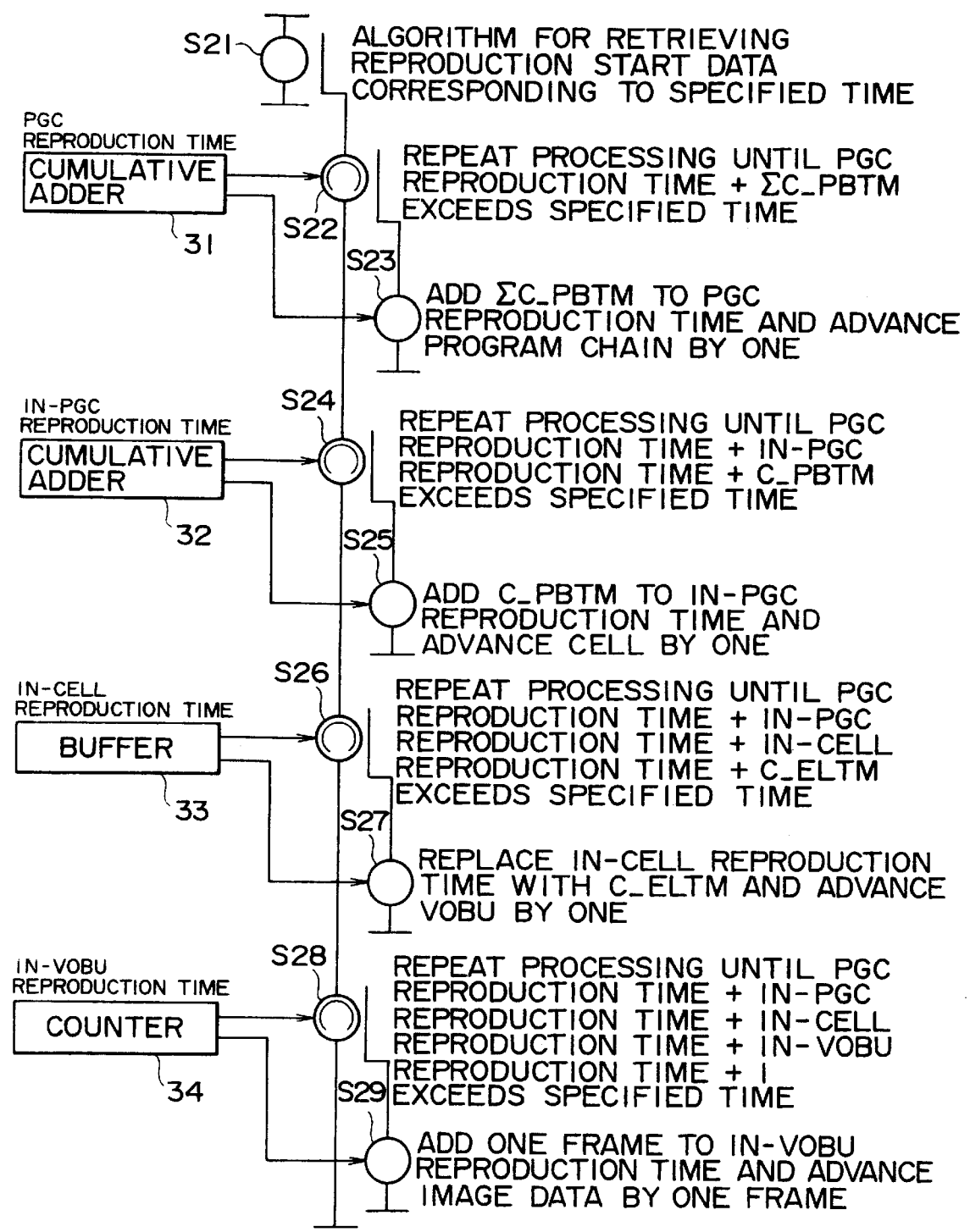
FIG. 5 is a chart for describing an algorithm for retrieving reproduction start data corresponding to a specified time of the reproduction time adjustment circuit 20 shown in FIG. 2.

A recording medium reproducing device according to the present invention comprises a first arithmetic or operating means (corresponding to Step S23 shown in FIG. 5, for example) for computing the total reproduction time in a third block by cumulatively adding second times together, a first storing means (corresponding to Step S22 shown in FIG. 5, for example) for storing therein the total reproduction time included or used till the immediately preceding third block from the initial third block at which the value cumulatively added by the first operating means becomes greater than a specified time, a second storing means (corresponding to Step S24 shown in FIG. 5, for example) for storing therein the total reproduction time included or used till the immediately preceding second block as viewed from the initial second block at which an added value obtained by cumulatively adding each second time in a second block of the initial third block, which is greater than the specified time, to the value stored in the first storing means, becomes greater than the specified time, a first retrieving means (corresponding to Steps S26 and S27 shown in FIG. 5, for example) for retrieving a first block whose start and end times are respectively posterior and anterior to the specified time in the initial second block at which the added value becomes greater than the specified time, and a second retrieving means (corresponding to Steps S28 and S29 shown in FIG. 5, for example) for retrieving a data unit corresponding to the specified time from the first block retrieved by the first retrieving means.

A method of reproducing a recording medium, according to the present invention comprises the following steps: a first operating step (corresponding to Step S23 shown in FIG. 5, for example) for computing the total reproduction time in a third block by cumulatively adding second times together, a first storing step (corresponding to Step S22 shown in FIG. 5, for example) for storing therein the total reproduction time included or used till the immediately preceding third block from the initial third block at which the value cumulatively added in the first operating step becomes greater than a specified time, a second storing step (corresponding to Step S24 shown in FIG. 5, for example) for storing therein the total reproduction time included or used till the immediately preceding second block as viewed from the initial second block at which an added value obtained by cumulatively adding each second time in a second block of the initial third block, which is greater than the specified time, to the value stored in the first storing step, becomes greater than the specified time, a first retrieving step (corresponding to Steps S26 and S27 shown in FIG. 5, for example) for retrieving a first block whose start and end times are respectively posterior and anterior to the specified time in the initial second block at which the added value becomes greater than the specified time, and a second retrieving step (corresponding to Steps S28 and S29 shown in FIG. 5, for example) for retrieving a data unit corresponding to the specified time from the first block retrieved in the first retrieving step.

A recording medium reproducing device according to the present invention comprises, in order to manage a reproduction time for a recording medium, a counting means (corresponding to the counter 34 shown in FIG. 2, for example) for counting time units corresponding to the number of reproduced data units within a first block and clearing their counted values when all the data units in the first block are played back, a first storing means (corresponding to the buffer 33 shown in FIG. 2, for example) for storing therein a first time as a reproduction time included or used till its reproduction when the data units in the first block are all reproduced, and clearing its stored value when all the first blocks in a second block are played back, and a second storing means (corresponding to the cumulative adder 32 shown in FIG. 2, for example) for storing therein a second time as a reproduction time included or used till its reproduction when all the first blocks in the second block are reproduced, and includes, in order to specify a reproduction position on the recording medium, a first operating means (corresponding to Step S23 shown in FIG. 5, for example) for computing the total reproduction time in a third block by cumulatively adding second times, a third storing means (corresponding to Step S22 shown in FIG. 5, for example) for storing therein the total reproduction time included or used till the immediately preceding third block from the initial third block at which the value cumulatively added by the first operating means becomes greater than a specified time, a fourth storing means (corresponding to Step S24 shown in FIG. 5, for example) for storing therein the total reproduction time included or used till the immediately preceding second block as viewed from the initial second block at which an added value obtained by cumulatively adding a second time in a second block of the initial third block, which is greater than the specified time, to the value stored in the third storing means, becomes greater than the specified time, a first retrieving means (corresponding to Steps S26 and S27 shown in FIG. 5, for example) for retrieving a first block whose start and end times are respectively posterior and anterior to the specified time in the initial second block at which the added value becomes greater than the specified time, and a second retrieving means (corresponding to Steps S28 and S29 shown in FIG. 5, for example) for retrieving a data unit corresponding to the specified time from the first block retrieved by the first retrieving means.

A method of reproducing a recording medium, according to the present invention comprises, in order to manage a reproduction time for the recording medium, the following steps: a counting step (corresponding to Step S8 shown in FIG. 3, for example) for counting a time unit corresponding to the number of reproduced data units within a first block and clearing its counted value when all the data units in the first block are played back, a first storing step (corresponding to Step S9 shown in FIG. 3, for example) for storing therein a first time as a reproduction time included or used till its reproduction when the data units in the first block are all reproduced, and clearing its stored value when all the first blocks in a second block are played back, and a second storing step (corresponding to Step S10 shown in FIG. 3, for example) for storing therein a second time as a reproduction time included or used till its reproduction when all the first blocks in the second block are reproduced, and includes, in order to specify a reproduction position on the recording medium, a first operating step (corresponding to Step S23 shown in FIG. 5, for example) for computing the total reproduction time in a third block by cumulatively adding second times together, a third storing step (corresponding to Step S22 shown in FIG. 5, for example) for storing therein the total reproduction time included or used till the immediately preceding third block from the initial third block at which the value cumulatively added in the first operating step becomes greater than a specified time, a fourth storing step (corresponding to Step S24 shown in FIG. 5, for example) for storing therein the total reproduction time included or used till the immediately preceding second block as viewed from the initial second block at which an added value obtained by cumulatively adding a second time in a second block of the initial third block, which is greater than the specified time, to the value stored in the third storing step, becomes greater than the specified time, a first retrieving step (corresponding to Steps S26 and S27 shown in FIG. 5, for example) for retrieving a first block whose start and end times are respectively posterior and anterior to the specified time in the initial second block at which the added value becomes greater than the specified time, and a second retrieving step (corresponding to Steps S28 and S29 shown in FIG. 5, for example) for retrieving a data unit corresponding to the specified time from the first block retrieved in the first retrieving step.

Figure 1:
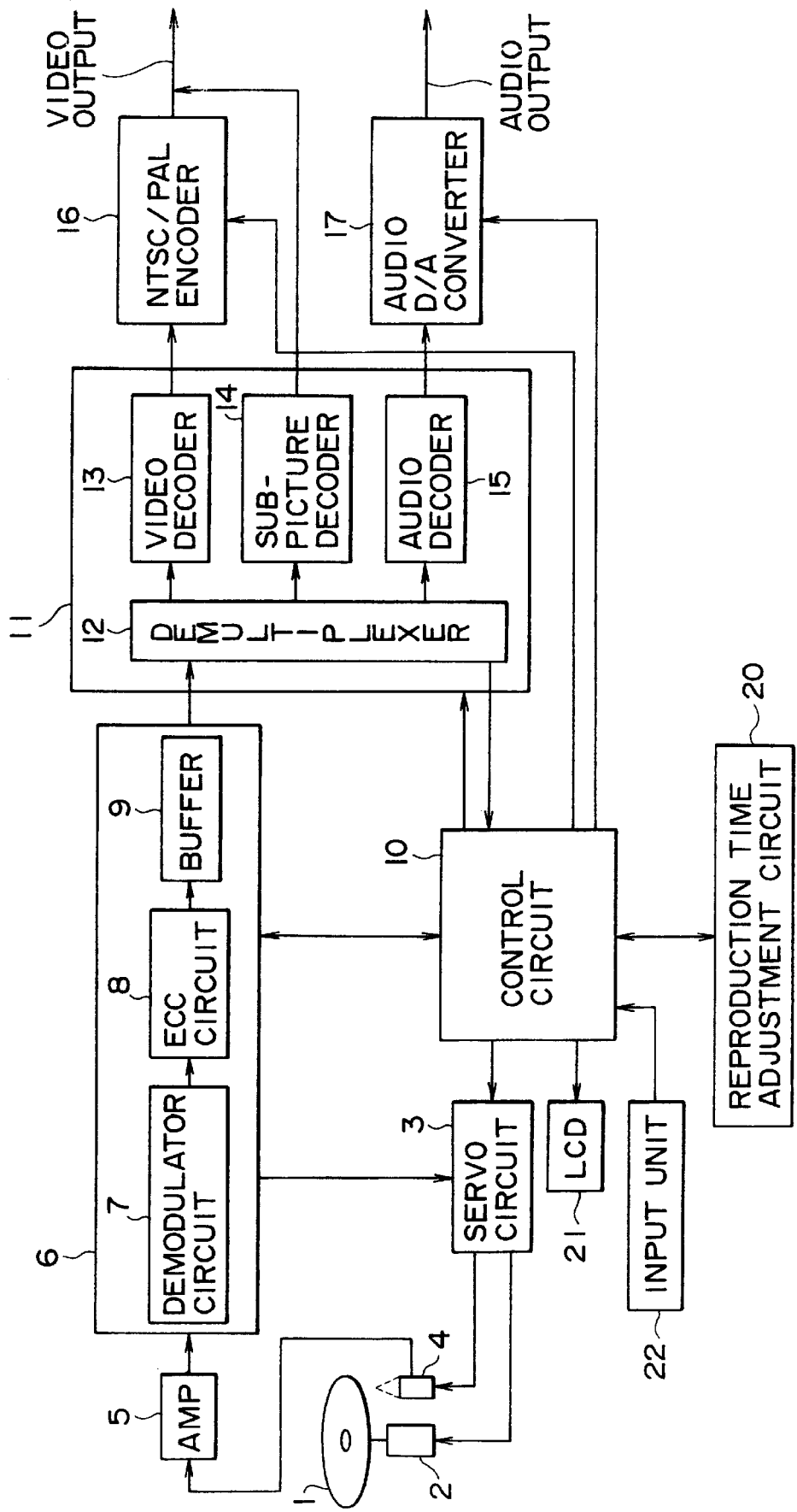
FIG. 1 is a block diagram showing a configuration of a DVD reproducing apparatus to which a recording medium reproducing device of the present invention is applied.

FIG. 1 shows an example of a configuration of a DVD reproducing apparatus to which the recording medium reproducing device of the present invention is applied. A disc (DVD) 1 is rotated by a spindle motor 2 controlled by a servo circuit 3. A pickup 4 applies a laser beam or light to the disc 1 and receives its reflected light to thereby reproduce data recorded on the disc 1. A reproduced RF signal outputted from the pickup 4 is amplified by an amplifier 5, followed by supply to a data supply circuit 6.

The servo circuit 3 is supplied with signals necessary for focus servo, tracking servo, thread servo, CLV servo, etc. from the data supply circuit 6 so as to generate error signals necessary for their control, thereby driving the spindle motor 2 or the pickup 4.

Figure 7:
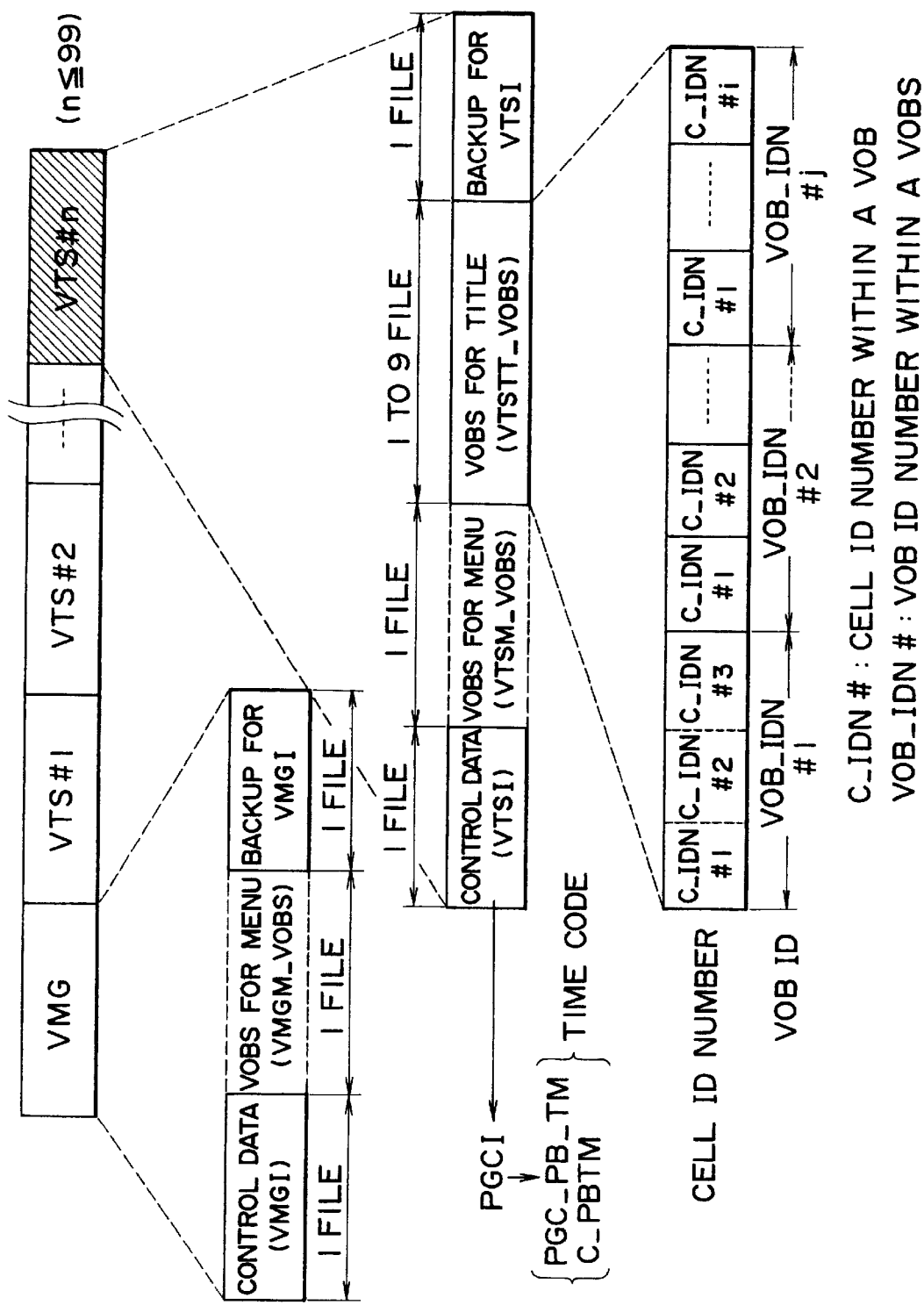
FIG. 7 is a diagram for describing formats of data recorded on a UDF on a DVD.
Figure 8:
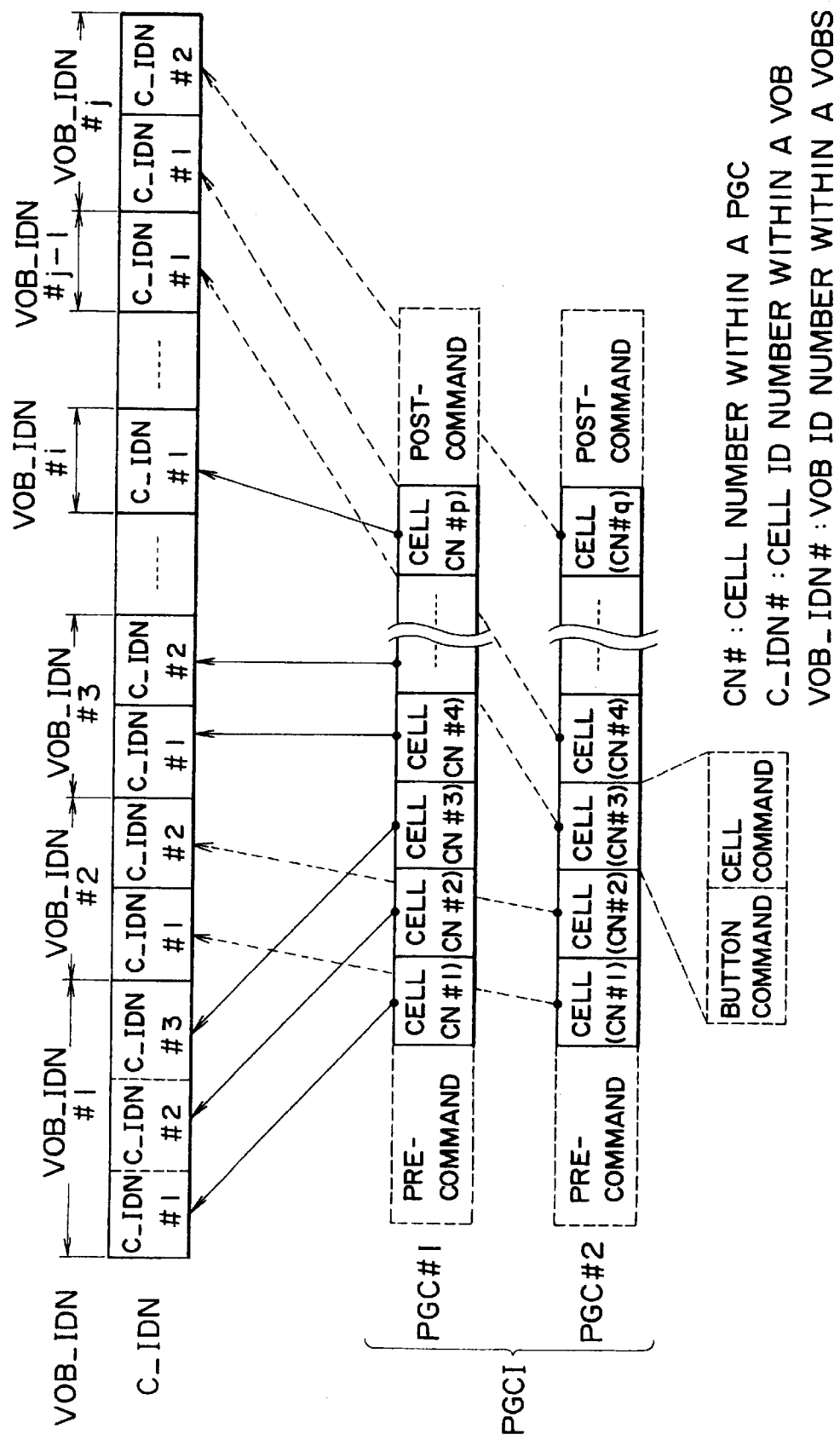
FIG. 8 is a diagram for explaining a PGCI.

A demodulator circuit 7 of the data supply circuit 6 performs EFM+(8–16 conversion) demodulation on a RF signal inputted from the amplifier 5 and outputs the result of demodulation to an ECC circuit 8. The ECC circuit 8 performs an error correction on the data inputted from the demodulator circuit 7 and thereafter outputs the corrected data to a buffer 9. The data stored in the buffer 9 is suitably read into a control circuit 10 and thereafter outputted to a demultiplexer 12 of a decode circuit 11. The data read from the buffer 9 to the control circuit 10 includes VMG and VTS and the like described with reference to FIG. 7.

Figure 9:
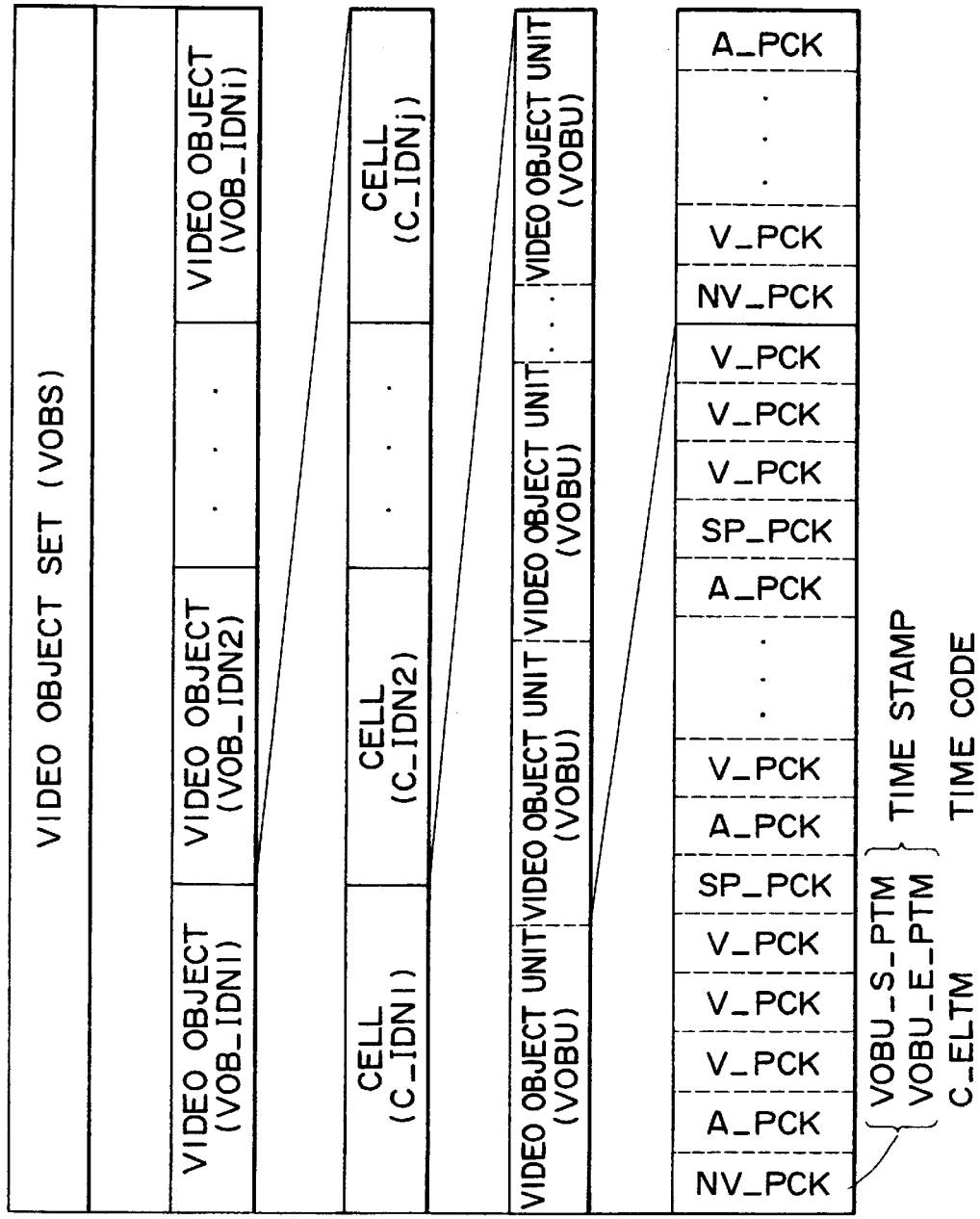
FIG. 9 is a diagram for describing a physical hierarchy of data.
Figure 10:
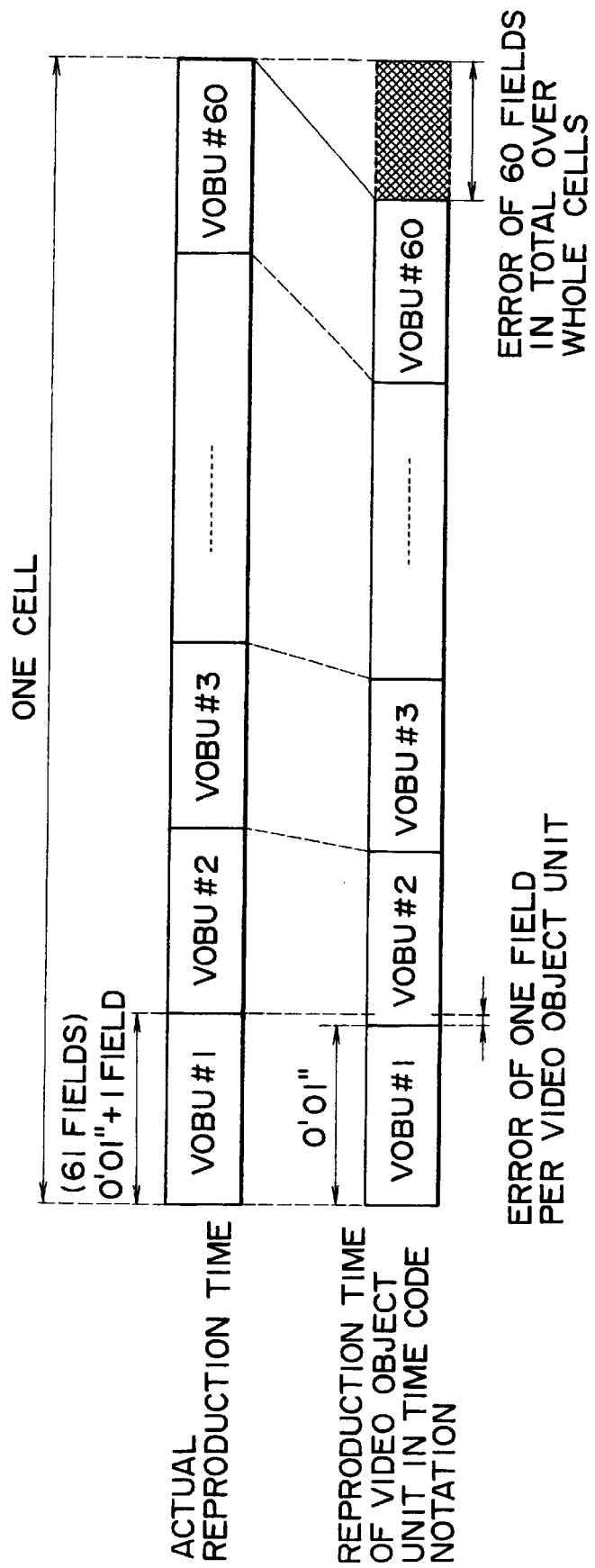
FIG. 10 is a diagram for explaining an error in time between a video object unit and each cell.
Figure 11:
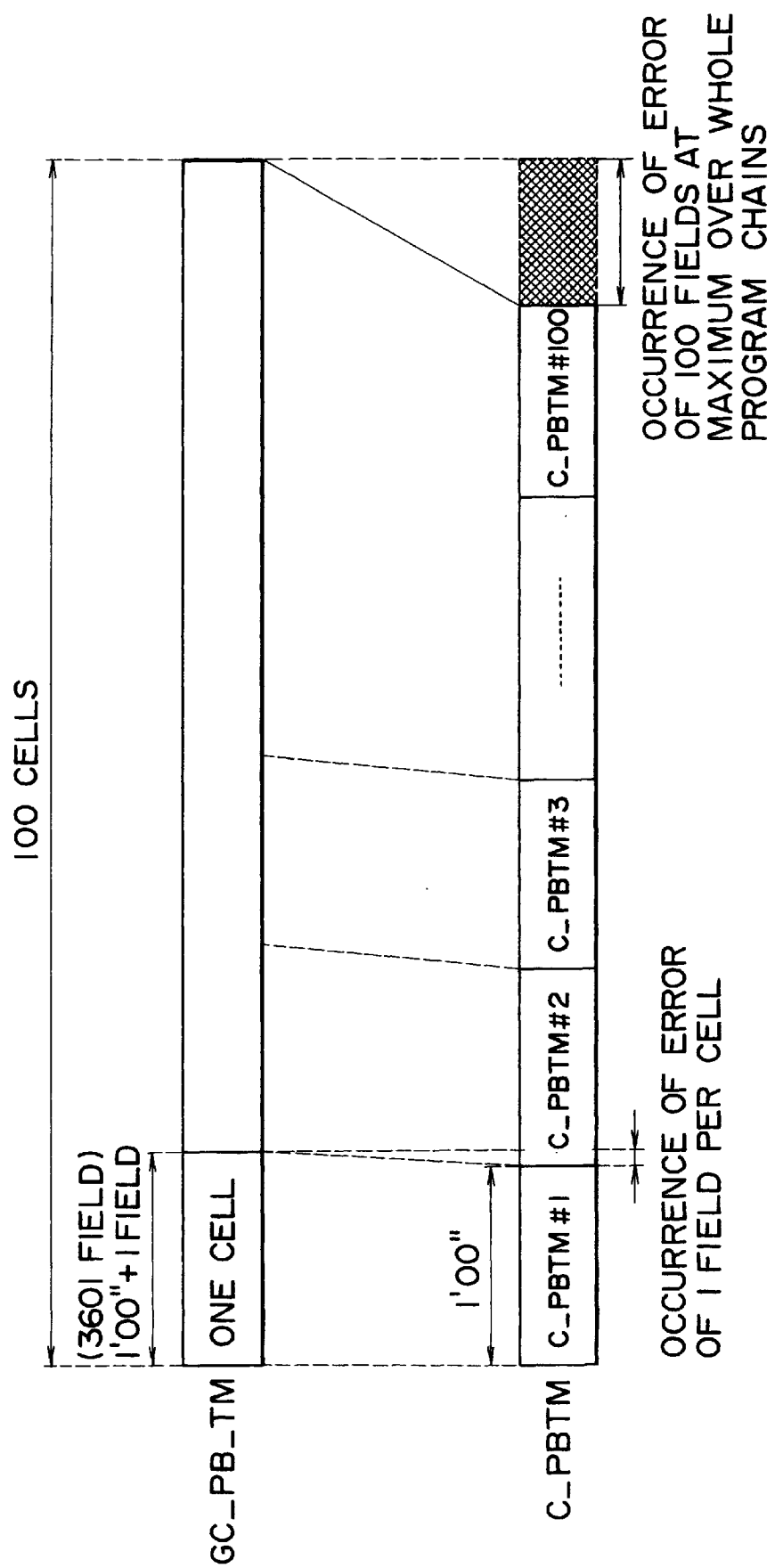
FIG. 11 is a diagram for explaining an error in time between each cell and a program chain.
Figure 12:
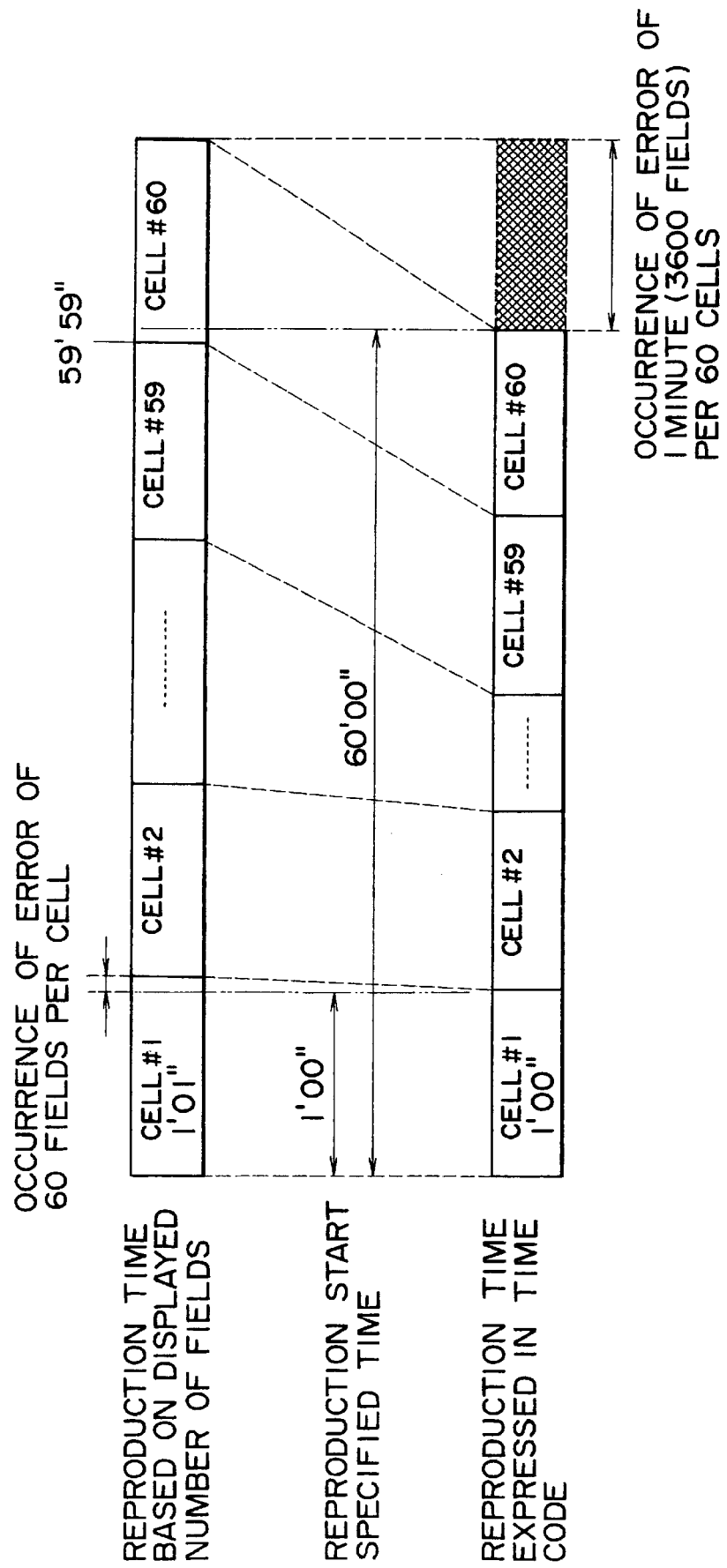
FIG. 12 is a diagram for explaining an error produced in a method of calculating a reproduction time.

In the decode circuit 11, the demultiplexer 12 separates the input data into video data, subpicture data and audio data and outputs them to a video decoder 13, a subpicture decoder 14 and an audio decoder 15 respectively. Further, the demultiplexer 12 separates data in the navigation pack described with reference to FIG. 9 from the input data and outputs it to the control circuit 10.

The video decoder 13 decodes the input data of video pack and outputs the decoded data to an NTSC/PAL encoder 16. The NTSC/PAL encoder 16 encodes the input video data into an NTSC or PAL video signal and outputs it to, for example, a CRT of an unillustrated television receiver. The subpicture decoder 14 decodes the input data of subpicture pack and synthesizes or combines it with the video signal outputted from the NTSC/PAL encoder 16 so as to be outputted to the television receiver. The audio decoder 15 decodes the input data of audio pack and outputs the decoded audio data to an audio D/A converter 17. The audio D/A converter 17 performs D/A conversion on the input audio data and outputs it to a speaker of the unillustrated television receiver.

A reproduction time adjustment circuit 20 is electrically connected to the control circuit 10. The reproduction time adjustment circuit 20 controls or adjusts a reproduction time, based on captured program chain information or time information recorded in the navigation pack captured through the demultiplexer 12, when the disc 1 is set.

When an input unit 22 is operated by a user, the input unit 22 outputs a command corresponding to its operation to the control circuit 10. An LCD 21 displays a reproduction time or the like supplied from the control circuit 10 thereon.

Figure 2:
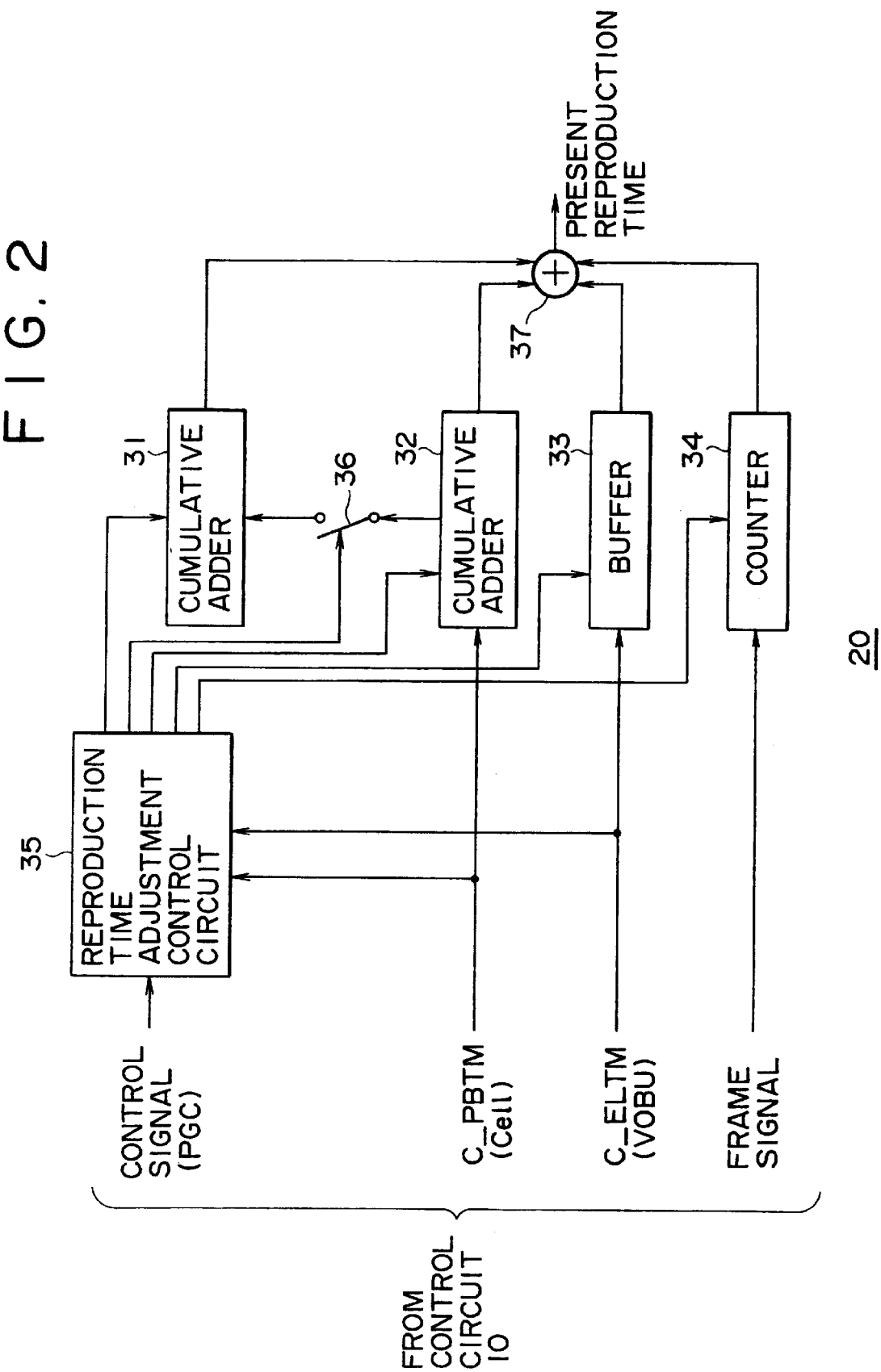
FIG. 2 is a block diagram illustrating a configuration of a reproduction time adjustment circuit 20 shown in FIG. 1.

FIG. 2 shows an example of a configuration of the reproduction time adjustment circuit 20. A reproduction time adjustment control circuit 35 initializes each of the cumulative adder 31, the cumulative adder 32, the buffer 33 and the counter 34 in response to a control signal sent from the control circuit 10 prior to the start of a reproduction time adjusting process. The counter 34 counts a frame signal supplied from the control circuit 10 each time a frame of image is displayed and outputs its counted value to an adder 37. The buffer 33 stores therein C_ELTM outputted from the control circuit 10 each time the reproduction of one video object unit is terminated. At this time, the reproduction time adjustment control circuit 35 clears the counter 34.

The cumulative adder 32 cumulatively adds C_PBTM outputted from the control circuit 10 each time the reproduction of one cell is completed, to the already-stored C_PBCM and stores the result of addition therein. Each time the cumulative addition is made, the reproduction time adjustment control circuit 35 clears the buffer 33.

When the reproduction of one program chain is finished, the reproduction time adjustment control circuit 35 turns a switch 36 on in response to the control signal supplied from the control circuit 10. At this time, the reproduction time adjustment control circuit 35 causes the cumulative adder 32 to supply the cumulatively-added value stored therein to the cumulative adder 31 and clears the cumulative adder 32. The cumulative adder 31 cumulatively adds the value inputted from the cumulative adder 32 to the already inputted and stored value and retains its cumulatively-added value therein.

The adder 37 adds the values stored in the cumulative adder 31, the cumulative adder 32, the buffer 33 and the counter 34. The output of the adder 37 indicates the present reproduction time.

When the disc 1 is mounted, the control circuit 10 controls the spindle motor 2 and the pickup 4 through the servo circuit 3 to rotate the disc 1 at a predetermined speed and allow the pickup 4 to read VMG and VTS (see FIG. 7) recorded at predetermined positions. At this time, a reproduced RF signal outputted from the pickup 4 is amplified by the amplifier 5, followed by supply to the demodulator circuit 7 of the data supply circuit 6, where it is subjected to EFM+demodulation. The ECC circuit 8 performs an error correcting process on the output of the demodulator circuit 7 and thereafter supplies it to the buffer 9, where it is stored therein. The control circuit 10 reads program chain information and other necessary data from the data stored in the buffer 9 and causes a built-in memory to store the read data therein.

When a reproduction command is started, the control circuit 10 causes the disc 1 to reproduce data recorded thereon in response to the read program chain. At this time, the reproduced RF signal outputted from the pickup 4 is inputted via the amplifier 5 to the demodulator circuit 7 where it is subjected to EFM+demodulation. Thereafter, the so-processed signal is subjected to the error correcting process by the ECC circuit 8 and written into the buffer 9. Data read out from the buffer 9 is inputted to the demultiplexer 12. The demultiplexer 12 outputs data in a video pack, of the input data to the video decoder 13, outputs data in a subpicture pack, of the input data to the subpicture decoder 14, outputs data in an audio pack, of the input data to the audio decoder 15, and outputs data in a navigation pack, of the input data to the control circuit 10.

The video decoder 13 decodes the input data of video pack and outputs it to the NTSC/PAL encoder 16. The NTSC/PAL encoder 16 encodes the input video data into, for example, an NTSC video signal and outputs it therefrom.

The subpicture decoder 14 decodes the input data of subpicture pack and combines it with the output of the NTSC/PAL encoder 16. Further, the subpicture decoder 14 outputs the combined data to the CRT of the television receiver, where it is displayed thereon.

The audio decoder 15 decodes the input data of audio pack and outputs it to the audio D/A converter 17. The audio D/A converter 17 converts the input audio data into D/A form and outputs it to the speaker of the television receiver. Thus, the program reproduced from the disc 1 can be audiovisually viewed through the television receiver.

The control circuit 10 reads time information from the data in the navigation pack, which is supplied from the demultiplexer 12 and causes the reproduction time adjustment circuit 20 to compute the present reproduction position (corresponding to a reproduction time from the beginning of a program). Further, the control circuit 10 causes the LCD 21 to display the reproduction time obtained by computation. A user can recognize the present reproduction position (corresponding to the reproduction time from the head of the program) while seeing the display of the reproduction time on the LCD 21.

Figure 3:
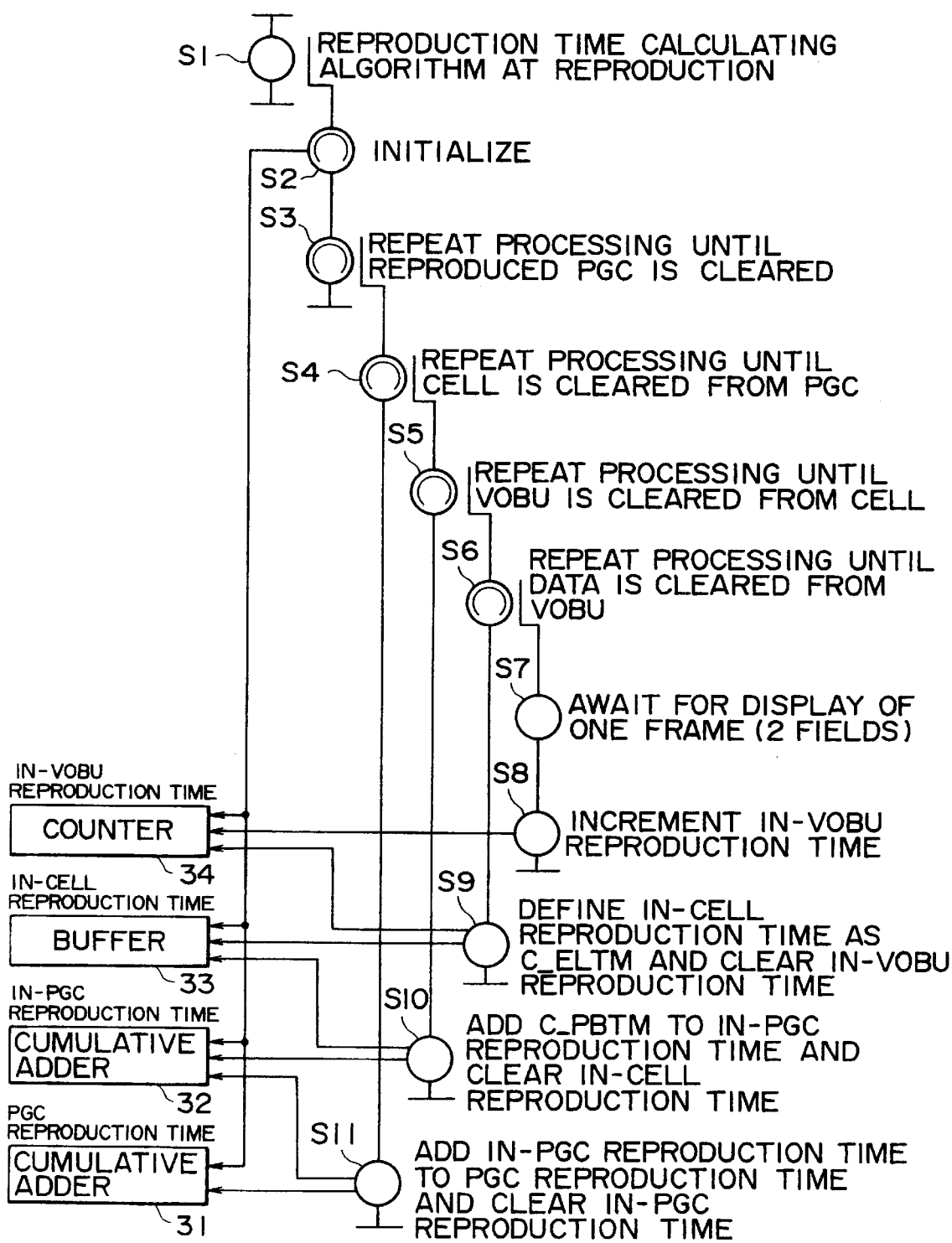
FIG. 3 is a chart for describing an algorithm required to determine a reproduction time of the reproduction time adjustment circuit 20 shown in FIG. 2.

A method of computing a reproduction time, which is executed by the reproduction time adjustment circuit 20, will next be described with reference to FIG. 3. FIG. 3 shows a reproduction time arithmetically-processing operation represented in the form of an HCP chart (hierarchical and compact description chart). In FIG. 3, Steps represented by arrows placed in individual circular graphics indicate that processes in Steps placed on the right-below sides thereof are repeatedly executed until predetermined conditions are met.

In Step S1, a process for calculating a reproduction time from the head of a program, which is indicative of a reproduction position of an image or picture reproduced from the disc 1, is first started. In Step S2, a process for initializing the cumulative adder 31, the cumulative adder 32, the buffer 33 and the counter 34 is executed. In all the processes from Steps S3 to S6, processes in Steps indicated on the lower sides as viewed at the right hands are repeatedly executed until conditions in the respective Steps are met. Namely, when a display of an image in one frame (2 fields) is placed in a standby state and the image in one frame is displayed in Step S7, a process for incrementing the count of the counter 34, which is indicative of a reproduction time in a video object unit, is executed in Step S8. Namely, when a frame signal is inputted from the control circuit 10 each time one frame of image is displayed, the counter 34 increments its count by 1. This process is repeatedly executed in Step S6 until all the video data in the video object unit are reproduced.

When it is determined in Step S6 that non-reproduce d video packs do not exist within the video object unit, the routine procedure proceeds to Step S9 where a process for allowing the buffer 33 indicative of an in-cell reproduction time to store C_ELTM therein and clearing the reproduction time in the video object unit is executed. Namely, when the reproduction of all the video packets in one video object unit is terminated and the reproduction of the next video object unit is started, C_ELTM indicative of a reproduction time in the video object unit, which has been recorded in a navigation pack placed at the head of the video object unit and counted from the head of its cell, is supplied to and stored in the buffer 33. At this time, the reproduction time adjustment control circuit 35 clears the count of the counter 34 and causes the counter 34 to count the subsequent input frame signal from 1 again.

Such processing is repeatedly executed each time the new video object unit in one cell is played back. Thus, the value of C_ELTM stored in the buffer 33 increases with the progress of the video object unit to be reproduced.

When it is determined in Step S5 that all the video object units constituting one cell have been reproduced, the routine procedure proceeds to Step S10, where a process for cumulatively adding, to the value so-far stored in the cumulative adder 32, which indicates a reproduction time in a program chain, C_PBTM indicative of the reproduction time for its cell and clearing the in-cell reproduction time is executed. Namely, when the disc 1 is mounted, the reproduction time adjustment control circuit 35 reproduces program chain information in its control data area and causes a built-in memory to store C_PBTM indicative of the reproduction time for each cell, which has been recorded therein. When the reproduction of one cell is completed, the reproduction time adjustment control circuit 35 reads C_PBTM corresponding to the cell and causes the cumulative adder 32 to cumulatively add C_PBTM to the so-far stored value and store the result of addition therein. simultaneously, the reproduction time adjustment control circuit 35 clears the buffer 33 and causes the buffer 33 to store C_ELTM of a video object unit of the next cell.

Figure 4:
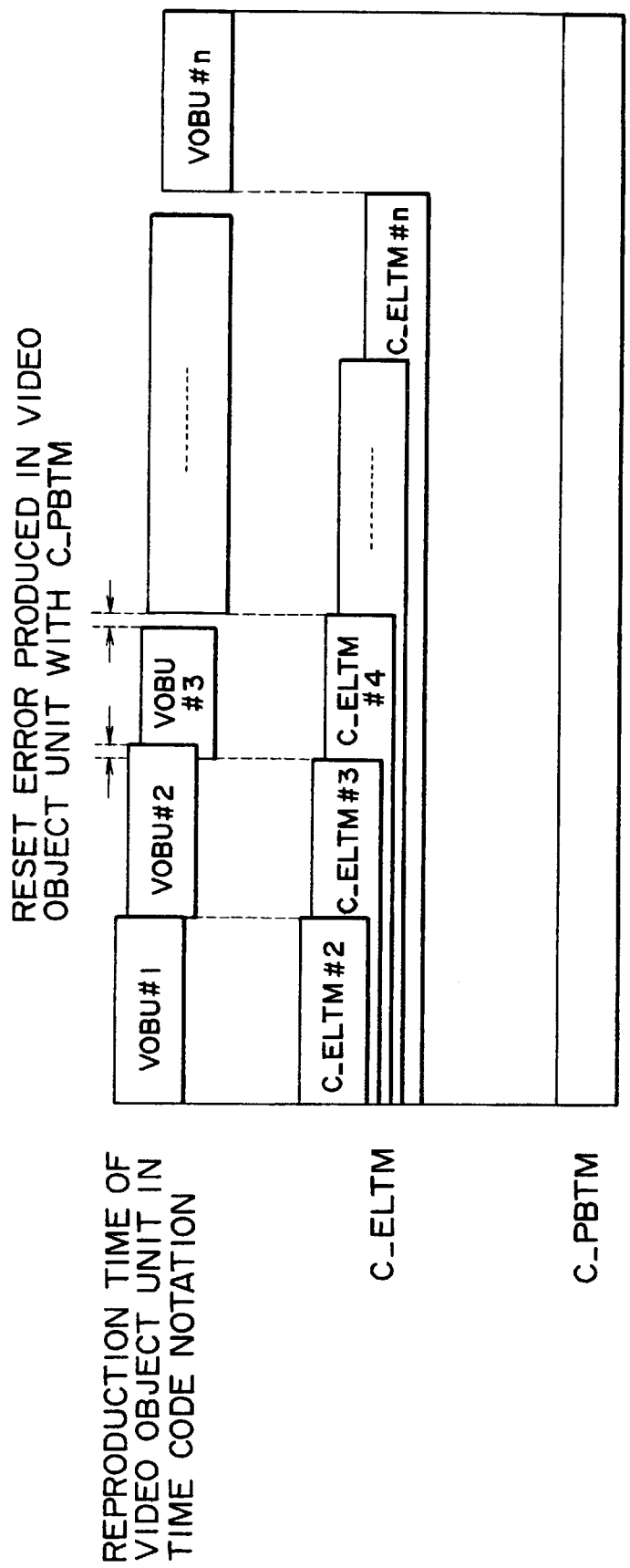
FIG. 4 is a diagram for describing the resetting of a reproduction time using C_ELTM.

A timing chart for describing the above-described processes is shown in FIG. 4. When the reproduction of one video object unit is completed, C_ELTM in a navigation pack disposed at the head of the next video object unit is read and stored in the buffer 33 as shown in the same drawing. C_ELTM indicates its reproduction time in each frame unit. However, video packets exist within individual video object units in field units. Thus, C_ELTM might have an error corresponding to one field. However, when the reproduction of all the video object units constituting one cell is completed, C_PBTM indicative of a reproduction time for its cell is stored in the cumulative adder 32. Accordingly, the error between the value stored in the cumulative adder 32 and the number of fields (corresponding to the number of fields for images contained in n video object units in FIG. 4) to be actually reproduced does not exceed one field.

When the new cell is reproduced, the above processing is repeatedly executed. When it is determined in Step S4 that all the cells in one program chain have been reproduced, the routine procedure proceeds to Step S1, where a process for cumulatively adding a reproduction time in the program chain to the value so-far stored in the cumulative adder 31, which indicates the reproduction time in the program chain, and clearing the value stored in the cumulative adder 32, which indicates the reproduction time in the program chain, is executed.

Namely, when all the cells in one program chain are played back, the control circuit 10 outputs a control signal to the reproduction time adjustment control circuit 35. At this time, the reproduction time adjustment control circuit 35 turns the switch 36 on to transfer the cumulatively-added value stored in the cumulative adder 32 to the cumulative adder 31, thereby allowing the cumulative adder 31 to cumulatively add the transferred value to the so far stored value and store the result of addition therein. Thus, the total reproduction time in one program chain is added to the cumulative adder 31. At this time, the cumulatively-added value stored in the cumulative adder 32 is cleared. The process of cumulatively adding the input C_PBTM to the cumulative adder is started again from the start each time each cell in the next program chain is reproduced.

The above-described processing is repeatedly executed until it is determined in Step S3 that the reproduction of all the program chains has been completed. When their reproduction is judged to have been completed, the process of computing the reproduction time is terminated.

As described above, the cumulative adder 31 stores therein the total reproduction time included or used up to the program chain immediately preceding the program chain being reproduced at that time. The cumulative adder 32 stores therein the reproduction time included or used up to the cell immediately preceding the now-reproduced cell from the head in the now-reproduced program chain. The buffer 33 stores therein the reproduction time included from the head of the now-reproduced cell to the video object unit immediately preceding the now-reproduced video object unit. The counter 34 stores therein the number of frames from the head of the now-reproduced video object unit to the immediately preceding reproduced frame. Accordingly, the reproduction time for the present disc 1 is obtained by adding together the values stored in the cumulative adder 31, the cumulative adder 32, the buffer 33 and the counter 34 with the adder 37. The control circuit 10 causes the LCD 21 to display this reproduction time thereon.

Thus, when the user stops reproducing on business in the course of its reproduction while audiovisually viewing the program recorded on the disc 1, the user makes a note of the reproduction time (reproduction position) displayed on the LCD 21 at that time. Thereafter, the user is able to specify the reproduction time as a reproduction start position again and resume its reproduction from the specified time.

In such a case, the user operates the input unit 22 so as to input the reproduction time noted by the user upon interruption of its reproduction as a reproduction start time (specified time). When such a command is input from the user, the control circuit 10 retrieves reproduction start data specified at the specified time in accordance with an algorithm shown in a chart in FIG. 5.

In Step S21, an algorithm process for retrieving reproduction start data corresponding to a specified time is first started. In Step S23, the control circuit 10 calculates or computes the sum of reproduction times C_PBTM in all the cells constituting a program chain instructed to reproduce. It is determined in Step S22 whether a value obtained by cumulatively adding the sum to the cumulatively-added value stored in the cumulative adder 31 exceeds the specified time. If the value is found not to exceed the specified time in Step S22, then the sum is supplied to the cumulative adder 31 where it is cumulatively added to the already-stored value in Step S23 again.

The above-described operation is repeatedly executed in Step S22 until it is determined whether a value obtained by adding a reproduction time (corresponding to the sum of C_PBTM in all the cells) in the next program chain to the cumulatively-added value stored in the cumulative adder 31 exceeds the specified time. If it is determined in Step S22 that the sum of reproduction times in a predetermined number of program chains exceeds the specified time, then the routine procedure proceeds to Step S25 via Step S24, where a process for cumulatively adding the reproduction times C_PBTM for the respective cells in the program chains to the cumulative adder 32 is repeatedly executed until it is determined in Step S24 that a value obtained by adding together the cumulatively-added value stored in the cumulative adder 31, the cumulatively-added value stored in the cumulative adder 32 and the reproduction times C_PBTM for the individual cells exceeds the specified time.

Figure 6:
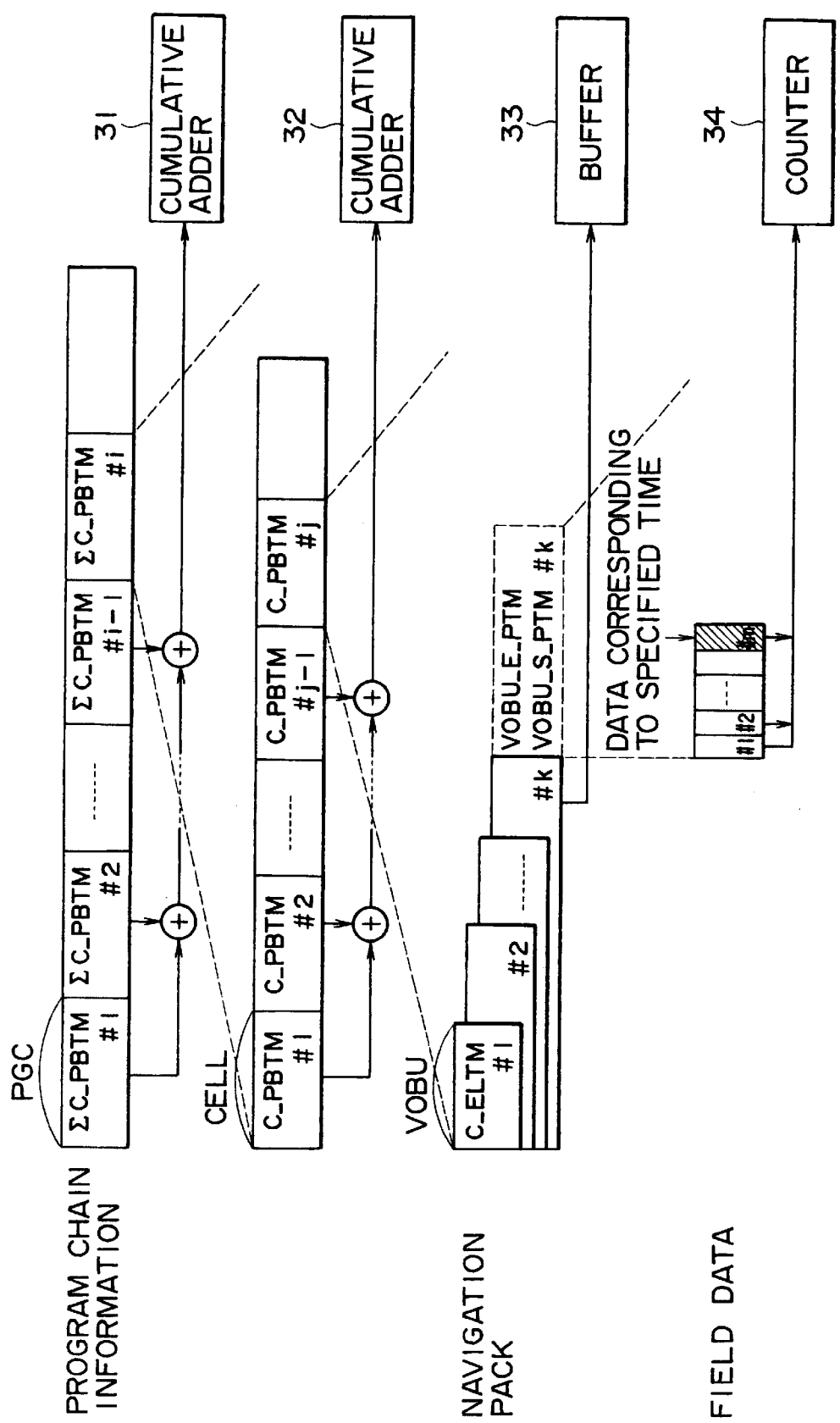
FIG. 6 is a diagram for describing the retrieval of the reproduction start data corresponding to the specified time.

Namely, reproduction times $\Sigma C\_PBTM$ from the start to an ith program chain are cumulatively added as shown in FIG. 6 in Step S22. When the so-added value exceeds the specified time, the added value is not stored in the cumulative adder 31. A cumulatively-added value corresponding to $\Sigma C\_PBTM$ from the start to the immediately preceding i-1th program chain is stored in the cumulative adder 31. In Step S25 at this time, the reproduction times C_PBTM for respective cells in the ith program chain are successively added to the cumulative adder 32. Next, a reproduction time C_PBTM for a jth cell is added to the cumulative adder 32. If it is determined in Step S24 that the so-added value exceeds the specified time, then the added value is not stored in the cumulative adder 32. A cumulatively-added value from the start to the immediately preceding j-1th cell is stored in the cumulative adder 32.

Next, the routine procedure proceeds to Step S27 via Step S26, where a process for storing reproduction times C_ELTM in respective video object units in the buffer 33 is repeatedly executed until it is determined in Step S26 that the sum or total time of the value stored in the cumulative adder 31, the value stored in the cumulative adder 32, and a reproduction time in a video object unit next to the video object unit corresponding to the reproduction time stored in the buffer 33 becomes greater than the specified time.

Namely, as shown in FIG. 6, reproduction times C_ELTM in a video object unit constituting a jth cell are successively read from the respective video object units and stored in the buffer 33. When the sum of a reproduction time C_ELTM stored in a navigation pack of, for example, a kth video object unit and the cumulatively-added values stored in the cumulative adders 31 and 32 is judged to exceed the specified time, a reproduction time C_ELTM stored in a navigation pack of a k-1th video object unit is retained in the buffer 33.

When it is determined in Step S26 that the sum of the reproduction times exceeds the specified time, the routine procedure proceeds to Step S29 via Step S28, where the operation of counting the number of frames in the video object unit referred to above by the counter 34 is repeatedly executed until it is determined in Step S28 that the so far reproduction time+time corresponding to one frame exceeds the specified time.

As shown in FIG. 6, for example, the number of frames in a kth video object unit is now successively counted by the counter 34. When the sum of the total reproduction times from the beginning to an mth frame is judged to exceed the specified time, the value of m−1 is retained in the counter 34. In this case, data corresponding to the mth frame is retrieved as a reproduction start position.

When the retrieval of the reproduction start data corresponding to the specified time is completed in this way, the control circuit 10 controls the pickup 4 through the servo circuit 3 so as to allow the pickup 4 to access the retrieved reproduction start data. Further, the control circuit 10 causes the pickup 4 to start reproducing from the accessed position. Thus, the reproduction is started from the reproduction start time corresponding to the specified time. The subsequent reproduction position is computed as shown in the flowchart in FIG. 3 and displayed on the LCD 21.

The present invention has been described above by the example in which the DVD is reproduced. However, the present invention can be applied even to the case in which another recording medium is reproduced.

According to a device for and a method of reproducing a recording medium, of the present invention, as has been described above, when data units in a first block are all played back, a counted value is cleared and each first time is stored as the reproduction time up to that time. It is therefore possible to prevent the cumulation of errors in reproduction time. As a result, the accurate reproduction time of the recording medium can be obtained.

According to a device for and a method of reproducing a recording medium, of the present invention, the total reproduction time in a third block is computed by cumulatively adding second times together. The total reproduction time included up to the immediately preceding upper-order block from an upper-order block in which a value obtained by cumulatively adding together reproduction times in a low-order block becomes greater than a specified time, is stored subsequently in the same manner as described above. It is therefore possible to retrieve data accurately corresponding to the specified time.

According to a device for and a method of reproducing a recording medium, of the present invention, when all the data units in a first block are reproduced, a counted value is cleared and each first time is stored as the reproduction time up to that time. Further, the total reproduction time in a higher-order block is computed by cumulatively adding reproduction times in a lower-order block, whereby data corresponding to a specified time is retrieved. It is therefore possible to obtain the precise reproduction time and start the reproduction of data from the reproduction time accurately corresponding to the specified time.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A device for reproducing a recording medium, comprising:

means for reproducing the recording medium in which times corresponding to a predetermined number of data units are defined as time units, a first block is composed of a plurality of said data units, a second block is composed of a plurality of said first blocks, and first times each indicative of a reproduction time in said each second block are recorded in said first blocks in said time units respectively;

means for counting the time units corresponding to the number of the reproduced data units within said each first block and clearing its count when all the data units in said first block are played back; and first storing means for storing therein the first time as a reproduction time used up to that time when the data units in said first block are all reproduced.

2. A device according to claim 1, further including a second storing means which records second times indicative of the total reproduction time in a second block, at predetermined positions on a recording medium and clears the value stored in said first storing means when all the first blocks in the second block are reproduced and which, when all the first blocks in the second block are reproduced, cumulatively adds the second times to the stored value at that time and stores therein the result of addition as a reproduction time used till its reproduction.

3. A device according to claim 2, further including third storing means having a third block composed of a plurality of said second blocks and which clears the value stored in said second storing means when all the second blocks in the third block are reproduced and which, when all the second blocks in the third block are reproduced, cumulatively adds a value stored in said second storing means prior to being cleared, to the previously-stored value and stores the result of addition therein.

4. A device according to claim 1, wherein said recording medium is a DVD video, said data unit is a field, said time unit is a frame, said first block is VOBU, said first time is C_ELTM, and said second block is a Cell.

5. A device according to claim 3, wherein said second time is C_PBTM and said third block is PGC.

6. A method of reproducing a recording medium, comprising the following steps:

a step for reproducing the recording medium in which times corresponding to a predetermined number of data units are defined as time units, a first block is composed of a plurality of said data units, a second block is composed of a plurality of said first blocks, and first times each indicative of a reproduction time in said each second block are recorded in said first blocks in said time units respectively;

a counting step for counting the time units corresponding to the number of the reproduced data units within said each first block and clearing their counted values when all the data units in said first block are played back; and a first storing step for storing therein the first time as a reproduction time used up to that time when the data units in said first block are all reproduced.

7. A device for reproducing a recording medium, comprising:

means for reproducing the recording medium in which times corresponding to a predetermined number of data units are defined as time units, a first block is composed of a plurality of said data units, a second block is composed of a plurality of said first blocks, a third block is composed of a plurality of said second blocks, first times each indicative of a reproduction time in said each second block are recorded in said first blocks in said time units respectively, and second times indicative of the total reproduction time in said second block are recorded at predetermined positions;

first operating means for computing the total reproduction time in said third block by cumulatively adding said second times together;

first storing means for storing therein the total reproduction time included till the immediately preceding third block from the initial third block at which the value cumulatively added by said first operating means becomes greater than a specified time;

second storing means for storing therein the total reproduction time included till the immediately preceding second block as viewed from the initial second block at which an added value obtained by cumulatively adding each second time in said second block of the initial third block, which is greater than the specified time, to the value stored in said first storing means, becomes greater than the specified time;

first retrieving means for retrieving said first block whose start and end times are respectively posterior and anterior to the specified time in the initial second block at which the added value becomes greater than the specified time; and second retrieving means for retrieving the data unit corresponding to the specified time from the first block retrieved by said first retrieving means.

8. A method of reproducing a recording medium in which times corresponding to a predetermined number of data units are defined as time units, a first block is composed of a plurality of said data units, a second block is composed of a plurality of said first blocks, a third block is composed of a plurality of said second blocks, first times each indicative of a reproduction time in said each second block are recorded in said first blocks in said time units respectively, and second times indicative of the total reproduction time in said second block are recorded at predetermined positions, comprising the following steps:

a first operating step for computing the total reproduction time in said third block by cumulatively adding the second times together;

a first storing step for storing therein the total reproduction time included till the immediately preceding third block from the initial third block at which the value cumulatively added in the first operating step becomes greater than a specified time;

a second storing step for storing therein the total reproduction time included till the immediately preceding second block as viewed from the initial second block at which an added value obtained by cumulatively adding each second time in said second block of the initial third block, which is greater than the specified time, to the value stored in the first storing step, becomes greater than the specified time;

a first retrieving step for retrieving a first block whose start and end times are respectively posterior and anterior to the specified time in the initial second block at which the added value becomes greater than the specified time; and a second retrieving step for retrieving the data unit corresponding to the specified time from said first block retrieved in the first retrieving step.

9. A device for reproducing a recording medium, comprising:

means for reproducing the recording medium wherein times corresponding to a plurality of lengths of a predetermined number of data units are defined as time units, a first block is composed of a plurality of said data units, a second block is composed of a plurality of said first blocks, a third block is composed of a plurality of said second blocks, first times each indicative of a reproduction time in said each second block are recorded in said first blocks in said time units respectively, and second times indicative of the total reproduction time in said second block are recorded at predetermined positions;

means for managing a reproduction time of said recording medium; and means for detecting a reproduction position of said recording medium;

said managing means including, counting means for counting time units corresponding to the number of the reproduced data units within said first block and clearing their counted values when all the data units in the first block are played back, first storing means for storing therein the first time as a reproduction time included till its reproduction when the data units in the first block are all reproduced, and clearing its stored value when all the first blocks in said second block are played back, and second storing means for storing therein the second time as a reproduction time included till its reproduction when all the first blocks in the second block are reproduced, and said detecting means including, first operating means for computing the total reproduction time in said third block by cumulatively adding the second times, third storing means for storing therein the total reproduction time included till the immediately preceding third block from the initial third block at which the value cumulatively added by said first operating means becomes greater than a specified time, fourth storing means for storing therein the total reproduction time included till the immediately preceding second block as viewed from the initial second block at which an added value obtained by cumulatively adding each second time in the second block of the initial third block, which is greater than the specified time, to the value stored in said third storing means, becomes greater than the specified time, first retrieving means for retrieving the first block whose start and end times are respectively posterior and anterior to the specified time in the initial second block at which the added value becomes greater than the specified time, and second retrieving means for retrieving the data unit corresponding to the specified time from the first block retrieved by said first retrieving means.

10. A method of reproducing a recording medium, comprising the following steps:

- a step for reproducing said recording medium wherein times corresponding to a plurality of lengths of data units to be reproduced are defined as time units, a first block is composed of a plurality of said data units, a second block is composed of a plurality of said first blocks, a third block is composed of a plurality of said second blocks, first times each indicative of a reproduction time in said each second block are recorded in said first blocks in said time units respectively, and second times indicative of the total reproduction time in said second block are recorded at predetermined positions; and in order to manage the reproduction time of said recording medium,

- a counting step for counting the time units corresponding to the number of the reproduced data units within said first block and clearing their counted values when all the data units in the first block are played back,
- a first storing step for storing therein the first time as a reproduction time included till its reproduction when the data units in the first block are all reproduced, and clearing its stored value when all the first blocks in said second block are played back, and
- a second storing step for storing therein the second time as a reproduction time included till its reproduction when all the first blocks in the second block are reproduced, and in order to specify a reproduction position of said recording medium,

- a first operating step for computing the total reproduction time in said third block by cumulatively adding the second times,
- a third storing step for storing therein the total reproduction time included till the immediately preceding third block from the initial third block at which the value cumulatively added in said first operating step becomes greater than a specified time,
- a fourth storing step for storing therein the total reproduction time included till the immediately preceding second block as viewed from the initial second block at which an added value obtained by cumulatively adding each second time in the second block of the initial third block, which is greater than the specified time, to the value stored in said third storing step, becomes greater than the specified time,
- a first retrieving step for retrieving the first block whose start and end times are respectively posterior and anterior to the specified time in the initial second block at which the added value becomes greater than the specified time, and
- a second retrieving step for retrieving the data unit corresponding to the specified time from the first block retrieved in said first retrieving step.

* * * * *